United States Patent [19]

Watanabe

[11] Patent Number: 4,754,424
[45] Date of Patent: Jun. 28, 1988

[54] INFORMATION PROCESSING UNIT HAVING DATA GENERATING MEANS FOR GENERATING IMMEDIATE DATA

[75] Inventor: Tadashi Watanabe, Tokyo, Japan

[73] Assignee: NEC Corporation, Tokyo, Japan

[21] Appl. No.: 789,668

[22] Filed: Oct. 21, 1985

[30] Foreign Application Priority Data

Oct. 27, 1984 [JP] Japan .................................. 225104

[51] Int. Cl.[4] ............................................. G06F 9/00
[52] U.S. Cl. ................................................. 364/900
[58] Field of Search ......................... 364/200, 900, 760

[56] References Cited

U.S. PATENT DOCUMENTS

| 4,402,081 | 8/1983 | Ichimiya et al. | 371/21 |
| 4,418,383 | 11/1983 | Doyle et al. | 364/200 |
| 4,467,444 | 8/1984 | Harmon, Jr. et al. | 364/900 |
| 4,502,112 | 2/1985 | Fujiwara et al. | 364/200 |
| 4,608,634 | 8/1986 | Caudel et al. | 364/200 |

OTHER PUBLICATIONS

"IBM System/370 Principles Operation" (Ninth Edition), International Business Machines Corp., Oct. 1981, pp. 5-3 and 5-4.

Primary Examiner—Gareth D. Shaw
Assistant Examiner—John G. Mills, III
Attorney, Agent, or Firm—Foley & Lardner, Schwartz, Jeffery, Schwaab, Mack, Blumenthal & Evans

[57] ABSTRACT

An information processing unit including a first and second memory, a numerical data generating circuit, and a logical data generating circuit. The first memory stores a plurality of instruction words and data. The second memory temporarily stores one of the instruction words read from the first memory. When this instruction word, temporarily stored in the second memory, is a first specific instruction word and a first field contained in that instruction word indicates generation of data, the numerical data generating circuit responds. When the instruction word stored in the second memory is a first or a second specific instruction word and a second field contained in that instruction word indicates generation of data, the logical data generating circuit responds.

4 Claims, 3 Drawing Sheets

FIG. I

FIG. 3
| b29 | b30 | b31 | OUTPUT DATA | | | | | | | |
|---|---|---|---|---|---|---|---|---|---|---|
| 0 | 0 | 0 | 0 | 0 | 0 | 0 | 0 | 0 | 0 | 0 |
| 0 | 0 | 1 | 1 | 0 | 0 | 0 | 0 | 0 | 0 | 0 |
| 0 | 1 | 0 | 1 | 1 | 0 | 0 | 0 | 0 | 0 | 0 |
| 0 | 1 | 1 | 1 | 1 | 1 | 0 | 0 | 0 | 0 | 0 |
| 1 | 0 | 0 | 1 | 1 | 1 | 1 | 0 | 0 | 0 | 0 |
| 1 | 0 | 1 | 1 | 1 | 1 | 1 | 1 | 0 | 0 | 0 |
| 1 | 1 | 0 | 1 | 1 | 1 | 1 | 1 | 1 | 0 | 0 |
| 1 | 1 | 1 | 1 | 1 | 1 | 1 | 1 | 1 | 1 | 0 |
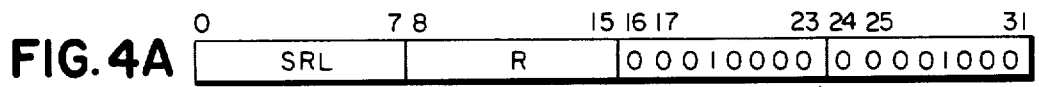
FIG. 4A
| 0 | 7 8 | 15 16 | 17 | 23 24 | 25 | 31 |
| SRL | R | 0 0 0 1 0 0 0 0 | 0 0 0 0 1 0 0 0 |
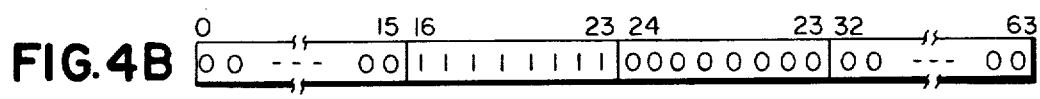
FIG. 4B
| 0 | 15 16 | 23 24 | 23 32 | 63 |
| 0 0 --- 0 0 | 1 1 1 1 1 1 1 1 | 0 0 0 0 0 0 0 0 | 0 0 --- 0 0 |
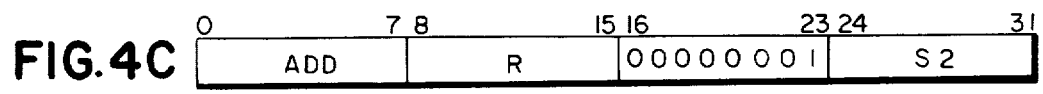
FIG. 4C
| 0 | 7 8 | 15 16 | 23 24 | 31 |
| ADD | R | 0 0 0 0 0 0 0 1 | S2 |
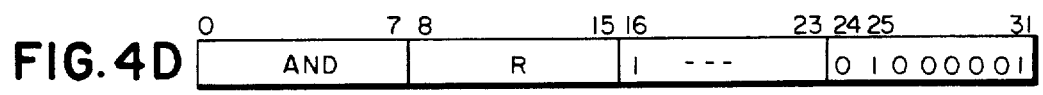
FIG. 4D
| 0 | 7 8 | 15 16 | 23 24 25 | 31 |
| AND | R | 1 --- | 0 1 0 0 0 0 0 1 |
FIG. 5
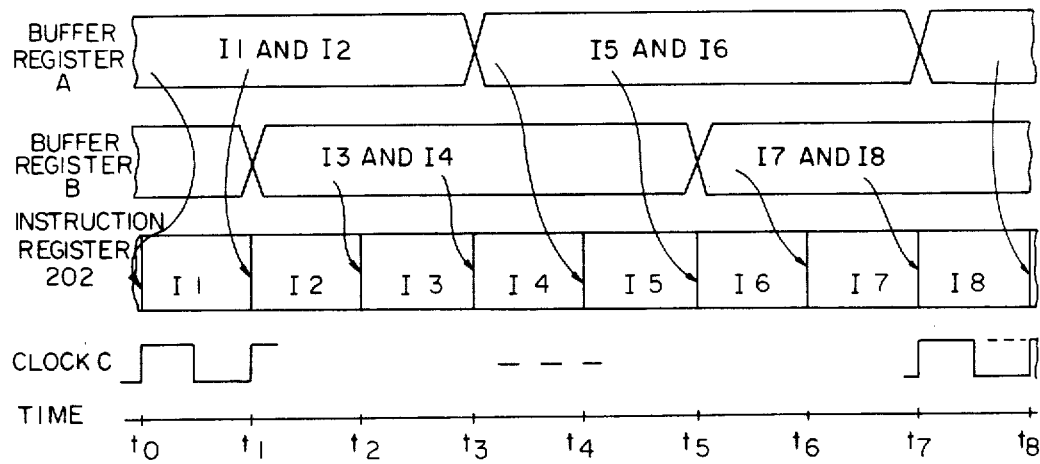

INFORMATION PROCESSING UNIT HAVING DATA GENERATING MEANS FOR GENERATING IMMEDIATE DATA

BACKGROUND OF THE INVENTION

The present invention relates to an information processing unit.

In a prior art information processing unit, immediate data that can be generated by a single instruction is limited to either integral data or logical data. Moreover, no arithmetic operation of the immediate data and the content of an arithmetic register can be executed. If such an operation is desired between the immediate data and the content of one selected arithmetic register, the former have to be once loaded into another selected arithmetic register, and only then can the desired operation be performed between the two registers.

Therefore, required processing may need extra instruction steps with a corresponding increase in processing time. Furthermore, to provide a unit with adequate functions, a greater variety of instructions are needed with more complicated instruction control and a greater number of arithmetic circuits.

One example of instruction formats used in the prior art unit is disclosed in "IBM System/370 Principles Operation" (Ninth Edition), published by International Business Machines Corporation in October 1981, pp. 5-3 and 5-4.

An object of the present invention is, therefore, to provide an information processing unit free from the above-mentioned disadvantages of the prior art processing unit.

SUMMARY OF THE INVENTION

According to an aspect of the invention, there is provided an information processing unit which comprises: first memory means for storing a plurality of instruction words and a plurality of data; second memory means for temporarily storing one of said instruction words read out of said first memory means; numerical data generating means for generating numerical data when said instruction word stored in said second memory means is a first specific instruction word and a first field contained in the first specific instruction word demands generation of data; and logical data generating means for generating logical data when an instruction word stored in said second memory means is said first specific instruction word or a second specific instruction word and a second field contained in said first or second specific instruction word demands generation of data.

BRIEF DESCRIPTION OF THE DRAWINGS

Other features and advantages of the invention will become apparent from the following description when taken in conjunction with the accompanying drawings in which:

FIG. 3 is a truth table;

FIGS. 4A, 4B, 4C, and 4D are diagrams for describing the embodiment; and

FIG. 5 is a diagram for describing the operation of the circuit 201.

In these drawings, the same reference numerals represent correspondingly the same structural elements.

DETAILED DESCRIPTION OF THE PREFERRED EMBODIMENT

Figure 1:
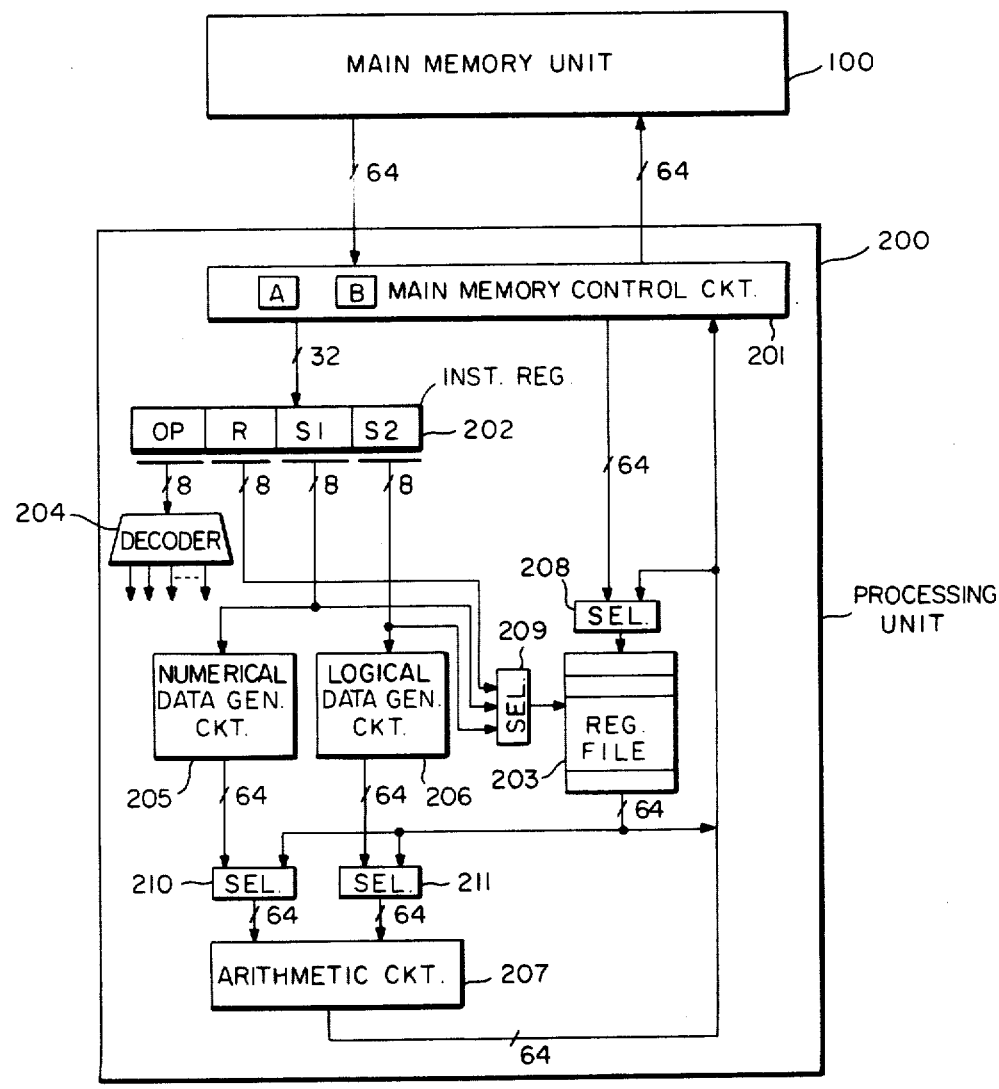
FIG. 1 is a block diagram of one preferred embodiment of the present invention.

Referring to FIG. 1, a preferred embodiment of the invention comprises a main memory unit 100 for storing instruction words (IW's) and data, and a processing unit 200. The unit 200 further comprises a main memory control circuit 201, a 32-bit instruction register 202, a numerical data generator circuit 205, a logical data generator circuit 206, a register file 203 having 128 64-bit arithmetic registers, a decoder 204, an arithmetic circuit 207 and selector circuits 208 to 211. The instruction register 202 functions to temporarily store one IW read out of the unit 100 via the circuit 201. Bit positions 0 to 7, bit positions 8 to 15, bit positions 16 to 23 and bit positions 24 to 31 of an IW stored in the register 202 constitute an operation code OP for designating the type of instruction to be executed, a register designating field R for designating one of the arithmetic registers in the register file 203, a first operand designating field S1 for designating first immediate data or one of the arithmetic registers, and a second operand designating field S2 for designating second immediate data or another one of the arithmetic registers. The field OP of the IW is given from the instruction register 202 to the decoder 204 to generate various control signals required for execution of the instruction. The circuit 205, as will be described in further detail below, functions to generate desired 64-bit integral data in response to the field S1 of the IW. The circuit 206, as will also be described in further detail below, functions to generate desired 64-bit logical data in response to the field S2 of the IW. The circuit 210 selects either data supplied from the circuit 205 or those supplied from the register file 203 in response to a control signal from the decoder 204. The circuit 211 selects either data supplied from the circuit 206 or those supplied from the register file 203 in response to the control signal of the decoder 204. The arithmetic circuit 207 processes data supplied from the circuit 210 and/or the circuit 211 as demanded by the field OP of the IW. Data supplied from the arithmetic circuit 207 is either stored in the memory unit 100 via the circuit 201 or given to the circuit 208. The circuit 208 selects either the data supplied from the arithmetic unit 207 or those read out of the memory unit 100 via the circuit 201 to supply the selected data to the register file 203. To designate one of the arithmetic registers in the register file 203, the circuit 209 selects one of the field R, S1 and S2 of the IW stored in the register 202. The circuit 201 has an instruction buffer comprising, for instance, two 64-bit instruction buffer registers A and B.

The supply of the IW's to the instruction register 202 via these registers A and B will be briefly described with reference to FIGS. 1 and 5. Suppose that, at a point of time t0, an IW I1 is stored in advance at the 32 high order bit positions of the buffer register A, and another IW I2, at the 32 low order bit positions of the same. Then, the IW I1 is loaded from the register A into the register 202, and executed. Next, one machine cycle after the time t0, the IW I2 is loaded from the register A into the register 202, and executed. Meanwhile, at a point of time t1, an IW I3 is read out of the memory unit 100 at the 32 high order bit positions of the buffer register B, and another IW I4, at the 32 low order bit positions of the same. The IW's I3 and I4 are read out by way of a 64-bit bus at the same time. Next, at points of time t2 and t3, the IW's I3 and I4 are sequentially loaded from the buffer register B into the register 202, and executed. Hereupon, at the time t3, the next IW's I5 and I6 are read, in the same way as described above, out of the memory unit 100 into the buffer register A. Hereinafter, similar processing is executed. Incidentally, the reading method hitherto described is but one example, and the choice of a reading method is not essential to the present invention. Every circuit element constituting the preferred embodiment operates in synchronism with a clock signal C shown in FIG. 5.

Figure 2:
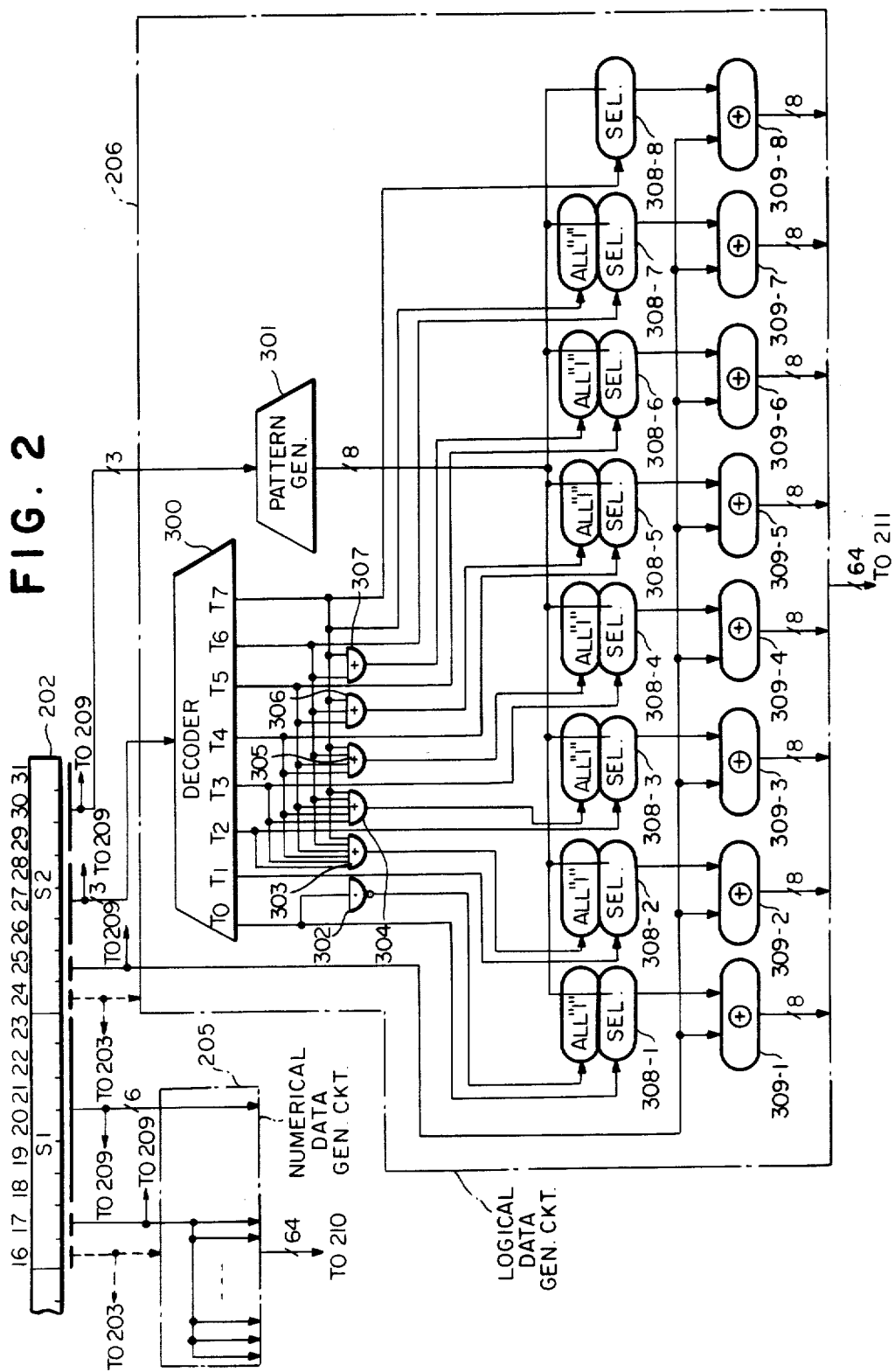
FIG. 2 is a circuit diagram of the principal part of the embodiment.

Referring now to FIG. 2, the numerical data generator circuit 205 is so structured as to receive the field S1, i.e., the contents of the bit positions 16 to 23 of the IW stored in the instruction register 202. The content of the bit position 16 of the IW is also fed to the circuit 203. When the content of the bit position 16 assumes the logical level of "1" (hereinafter abbreviated to simply "1"), the bit positions 17 to 23 of the IW are used for designating one arithmetic register of the register file 203. When the content of the bit position 16 is "0", the circuit 205 supplies the circuit 210 with 64-bit integral data. Each of 58 high order bits of the 64-bit integral data is equal to the logical level of the content of the bit position 17 of the IW. Six low order bits of the 64-bit integral data are equal to the contents of the bit positions 18 to 23 of the IW. These integral data can represent values from $-64$ to $+63$ (negative numbers are represented in two's complement form).

The logical data generator circuit 206 for receiving the field S2, i.e., the contents of the bit positions 24 to 31 of the IW comprises a decoder 300, a pattern generator 301, a NAND gate 302, OR gates 303 to 307, selector circuits 308-1 to 308-8, and exclusive OR gates 309-1 to 309-8. When the content at the bit position 24 of the IW is "1", the bit positions 25 to 31 of the IW are used for designating one of the arithmetic registers of the register file 203. When the content of the bit position 24 of the IW is "0", the circuit 206 operates as described below. With the contents of the bit positions 26, 27 and 28 of the IW being represented by b26, b27 and b28, respectively, the decoder 300 gives "1" at its output terminal Ti (where $i = b26 \times 2^2 + b27 \times 2^1 + b28 \times 2^0$). With the contents of the bit positions 29 to 31 of the IW being represented by b29 to b31, respectively, the generator 301 gives eight-bit data as shown in FIG. 3, in response to these bit positions 29 to 31. The NAND gate 302 inverts the logical level of the output of the terminal T0 of the decoder 300. The OR gate 303 executes the OR (logical add) operation of the outputs of the terminals T2 to T7; the OR gate 304, that of the outputs of the terminals T3 to T7; the OR gate 305, that of the outputs of the terminals T4 to T7; the OR gate 306, that of the outputs of the terminals T5 to T7; and the OR gate 307, that of the outputs of the terminals T6 and T7. The selector circuit 308-j (j=1 through 8) has a first selection terminal. The circuit 308-j gives the output data of the generator 301 to the gate 309-j when the output of the terminal $T_k$ ($k = j - 1$) connected to the first selection terminal of the circuit 308-j is "1". Each of the circuits 308-1 to 308-7 has a second selection terminal. The second selection terminals of the circuit 308-1 to 308-6 are connected to the gates 302 to 307, respectively. The second selection terminal of the circuit 308-7 is connected to the terminal T7. In response to the supply of "1" to the second selection terminal of the circuit 308-1, the circuit 308-1 provides the gate 309-1 with eight-bit data whose each bit is "1". In the same way, upon application of "1" to each of the second selection terminals of the circuits 308-2 to 308-7, the circuits 308-2 to 308-7 provide the gates 309-2 to 309-7 with eight-bit data having each bit a "1", respectively. When both the first and second selection terminals of each of the circuits 308-1 to 308-7 are given "0", the circuits 308-1 to 308-7 supply the gates 309-1 to 309-7 with eight-bit data having each bit a "0", respectively. With the application of "0" to the first selection terminal of the circuit 308-8, the circuit 308-8 supplies the gate 309-8 with eight-bit data having each bit a "0".

The output data of the circuit 308-j passes the exclusive OR gate 309-j when the content of the bit position 25 of the IW is "0". On the other hand, the output data of the circuit 308-j passes the gate 309-j with their logical level inverted when the content of the bit position 25 of the IW is "1". As is evident from the foregoing description, the circuit 206 supplies 64-bit logical data. The 64-bit logical data consists of of the m ($= b26 \times 2^5 + b27 \times 2^4 + b28 \times 2^3 + b29 \times 2^2 + b30 \times 2^1 + b31 \times 2^0$) high order bits, each assuming "1" and the ($64 - m$) low order bits, each assuming "0" when the content of the bit position 25 of the IW is "0". On the contrary, the 64-bit logical data consists of the m high order bits, each assuming "0" and the (64-m) low order bits, each assuming "1" when the content of the bit position 25 of the IW is "1".

In this manner, operand data obtained, in response to the fields S1 and S2 of an IW, is fed to the arithmetic circuit 207 to undergo the operation designated by the field OP of the IW. The result of the operation is loaded into the arithmetic register designated by the field R of the IW.

Next will be described some of the instructions to be used in the present invention. A shift right logical (SRL) instruction is for shifting either the content of an arithmetic register or immediate data, both designated by the field S2 of the IW, to the right by the number of bits specified by the field S1 of the IW, and for loading the result into an arithmetic register designated by the field R of the IW.

FIG. 4A illustrates an example of this IW, and FIG. 4B, 64-bit data obtained by this IW. By the use of the exemplified IW, mask data for extracting one byte of data can be generated without accessing the main memory unit 100 and using other IW's.

A fixed point add (APD) instruction is for fixed-point adding two operands designated by the field S1 and S2 of the IW to load the result into an arithmetic register designated by the field R of the IW. FIG. 4C illustrates an example of this IW, by which one is added to data designated by the field S2 of the IW.

An AND instruction is for taking the bit-by-bit logical product of two operands designated by the field S1 and S2 of the IW to load the result into an arithmetic register designated by the field R of the IW.

FIG. 4D illustrates an example of this IW. In response to the field S2 of the illustrated IW, the 64-bit logical data is obtained, the most significant bit of the 64-bit logical data is "0" and each of the remaining 63 bits of the same is "1". If the content of the arithmetic register designated by the field S1 of the IW is floating-point data whose most significant bit is a sign bit, the execution of the IW may provide an absolute value of the floating-point data (where it is supposed that the floating-point data is positive data when the sign bit of the floating-point data is "0" and the floating-point data is negative data when the sign bit is "1").

Obviously, instructions not using the circuits 205 and 206 are processed in the same manner as the prior art. For instance, for an operation between two registers, two input registers are selected from the register file 203 by the fields R and S1 of an IW, and the result of the operation designated by the IW is stored in the register designated by the field R of the IW. In this IW, the field S2 of the IW is not used.

Incidentally, while integral data is generated as numerical data by the numerical data generator circuit in the preferred embodiment, the numerical data so generated may conceivably be floating-point data.

While this invention has been described in conjunction with the preferred embodiment thereof, it will now readily be possible for those skilled in the art to put this invention into practice in various other manners.

What is claimed is:

1. An information processing unit having data generating means for generating immediate data comprising:
   first memory means for storing a plurality of instruction words and a plurality of data;
   second memory means for storing one of said instruction words read out of first memory means;
   numerical data generating means for generating numerical data, said numeric data generating means connected to said second memory means for receiving a first field of one of said instruction words which is stored in said second memory means and specifies generation of numerical data; and
   logical data generating means for generating one of first logical data and second logical data, said logical data generating means connected to said second memory means for receiving a second field of said one instruction word which is stored in said second memory means and specifies generation of logical data, said first logical data consisting of M high order bits each assuming a "1" logical level and N low order bits assuming a "0" logical level, and said second logical data consisting of M high order bits each assuming a "0" logical level and N low order bits each assuming a "1" logical level, where M and N are zero or positive integers, whereby mask data is generated by said one instruction word without any other instruction access to said first memory.

2. An information processing unit, as claimed in claim 1, further including third memory means having a plurality of storage locations, each of which is for storing said data read out of said first memory means, is assigned a unique address and is addressed by one of said first and second fields of said one instruction word stored in said second memory means.

3. An information processing means, as claimed in claim 2, further including arithmetic operation means receiving two of said numerical data from said numerical data generating means, said logical data from said logical data generating means and data from said third memory means, for performing an operation designated by said one instruction word stored in said second memory means.

4. An information processing unit, as claimed in claim 3, wherein the result of said operation performed by said arithmetic operation means is stored in one of said storage locations in said third memory means designated by said one instruction word stored in said second memory means.

* * * * *